United States Patent
Robin et al.

(10) Patent No.: US 9,436,393 B2
(45) Date of Patent: Sep. 6, 2016

(54) SECURE REDUNDANT STORAGE DEVICE AND SECURE READ/WRITE METHOD ON SUCH A DEVICE

(71) Applicant: Airbus Operations (SAS), Toulouse (FR)

(72) Inventors: Jean-Luc Robin, Saint-Jean (FR); Benjamin Klein, Saint-Lys (FR)

(73) Assignee: Airbus Operations (SAS), Toulouse (FR)

( * ) Notice: Subject to any disclaimer, the term of this patent is extended or adjusted under 35 U.S.C. 154(b) by 100 days.

(21) Appl. No.: 14/173,087

(22) Filed: Feb. 5, 2014

(65) Prior Publication Data

US 2014/0223243 A1 Aug. 7, 2014

(30) Foreign Application Priority Data

Feb. 5, 2013 (FR) ...................................... 13 50967

(51) Int. Cl.
*G06F 11/00* (2006.01)
*G06F 3/06* (2006.01)
*G06F 11/16* (2006.01)
*G06F 11/07* (2006.01)
*G06F 11/20* (2006.01)

(52) U.S. Cl.
CPC ........... *G06F 3/0619* (2013.01); *G06F 3/0646* (2013.01); *G06F 3/0689* (2013.01); *G06F 11/0727* (2013.01); *G06F 11/1612* (2013.01); *G06F 11/2087* (2013.01)

(58) Field of Classification Search
CPC ............... G06F 3/0653; G06F 3/0689; G06F 11/0727; G06F 11/1612; G06F 11/1629; G11B 20/1803

USPC ........................................................... 714/42
See application file for complete search history.

(56) References Cited

U.S. PATENT DOCUMENTS

| | | | | |
|---|---|---|---|---|
| 5,572,659 A * | 11/1996 | Iwasa et al. | ................. | 714/6.32 |
| 7,350,101 B1 * | 3/2008 | Nguyen et al. | ............. | 714/6.12 |
| 7,594,051 B2 * | 9/2009 | Abe | ............................... | 710/68 |
| 7,873,803 B2 * | 1/2011 | Cheng | .......................... | 711/161 |
| 2008/0120481 A1 | 5/2008 | Dolgunov et al. | | |
| 2009/0083485 A1 | 3/2009 | Cheng | | |
| 2010/0023840 A1 * | 1/2010 | Nakao et al. | ................. | 714/763 |

FOREIGN PATENT DOCUMENTS

| | | |
|---|---|---|
| DE | 3619174 | 6/1987 |
| EP | 0570168 | 11/1993 |

OTHER PUBLICATIONS

French Search Report, 2104-01-20.

* cited by examiner

*Primary Examiner* — Elmira Mehrmanesh
(74) *Attorney, Agent, or Firm* — Greer, Burns & Crain Ltd.

(57) ABSTRACT

Redundant storage devices in particular suitable for so-called SSD electronic disks. A data storage system is proposed based on a plurality of redundant physical storage disks in which the read/write commands intended to be sent to the redundant disks are subjected to a transfer function before being sent to at least one of the disks so that the actual commands sent to at least two disks are different. The values returned by the disks that received the commands that had undergone the transfer function are subjected to the inverse transfer function. Thus, a design error in the control module of the disks will be detected, since the control modules of the disks will not be called identically.

13 Claims, 7 Drawing Sheets

SECURE REDUNDANT STORAGE DEVICE AND SECURE READ/WRITE METHOD ON SUCH A DEVICE

CROSS-REFERENCES TO RELATED APPLICATIONS

This application claims the benefit of the French patent application No. 1350967 filed on Feb. 5, 2013, the entire disclosures of which are incorporated herein by way of reference.

BACKGROUND OF THE INVENTION

The present invention relates to the field of redundant storage devices and is particularly suitable for so-called SSD (Solid State Drive) electronic disks. It relates more particularly to a secure redundant storage device and a secure read/write method on redundant electronic disks.

It relates in general to the implementation of a file system based on redundant electronic disks. The use of redundancy is a common means of providing reliability in data processing systems. Duplication of a data processing device allows the operations to be carried out in parallel on the plurality of redundant devices. The result of these operations is then compared. Thus, a fault or a malfunction of one of the devices is detected when the results provided by the redundant devices are different.

Figure 1:
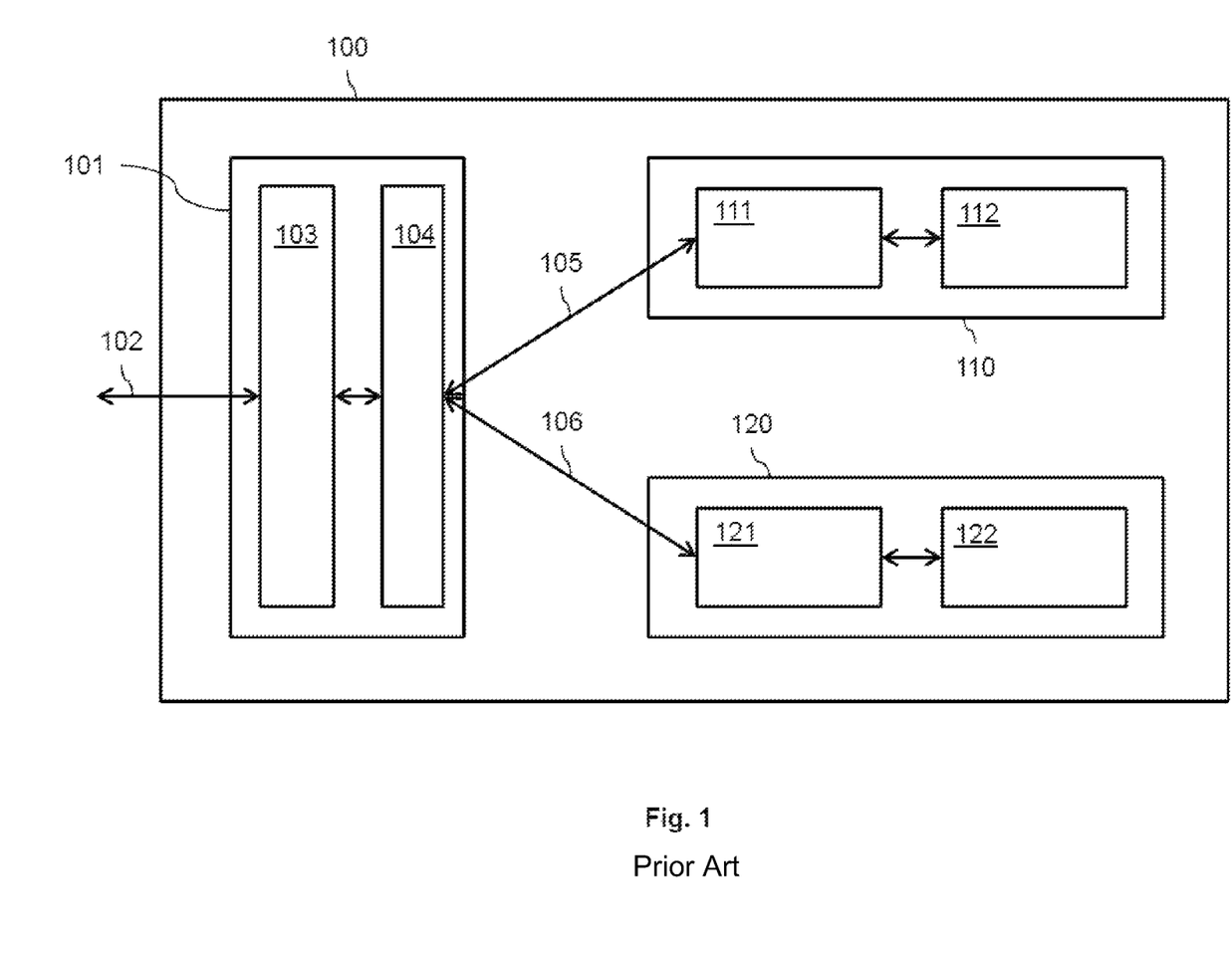
FIG. 1 illustrates the general architecture of a storage system using redundant electronic disks according to one embodiment example of the invention.

Application of this principle to a data storage system based on electronic disks leads to implementing a system of the type of system illustrated in FIG. 1. This storage device 100 is constituted by a module for management of the file system 101 and two physical storage devices, in this case redundant electronic disks 110 and 120. The example described here contains two redundant electronic disks, but a person skilled in the art will understand that the number of redundant electronic disks can be greater. These redundant electronic disks 110 and 120 are typically identical. At the very least they comprise in common at least a part of the software tasked with controlling the disk. They comprise a physical memory module 112 and 122 typically constituted by memory of the flash type, but any other type of physical medium such as an optical or magnetic medium can be envisaged. It can also be remote storage devices such as network disks in which the physical medium is located remotely and is accessed via a data network. This memory is controlled by a control module, or controller, 111 and 121. This control module is tasked with receiving read/write commands 105 and 106 issued by the file system 101 and with managing these commands, causing the required reading and writing operations on the physical memory modules 112 and 122. These control modules 111 and 121 are typically software modules executed on an on-board processor of the disks 110 and 120. These software modules for controlling the disks are particularly complex in the case of physical media of the flash memory type in comparison with the equivalent control modules used in magnetic disks. In fact, management of the memory modules requires fine management of the memory blocks to even out the wear of these blocks, manage a cache memory and organize collection of the available blocks. The file system 101 is the software module tasked with offering a logical view of data files to applications wishing to store and access data on the disk. It receives commands 102 from the applications formulated in the form of logical file management commands. The file system 101 is tasked with transforming these file-oriented commands into an order for reading/writing on the different disks 110 and 120. This file system typically integrates, in the case of redundant physical disks, a module for management of the file system proper 103 and a redundancy management module 104. The storage system can therefore be viewed as a succession of successive abstractions allowing interaction with a plurality of physical electronic disks. A first abstraction is managed by the control module of the disk, 111 and 121 which makes it possible to mask the physical memory modules 112 and 122 used for offering an interface presenting the disk as a unified logical storage volume. This logical storage volume is stored redundantly on all the redundant disks of the storage device. A second level of abstraction is offered by the redundancy management module 104 and makes it possible to see the set of physical electronic disks 110 and 120 as a single volume allowing data reading and writing. This volume is used by the file system management module 103 to offer a third level of abstraction to the applications, which are offered a system for reading/writing in logical files independently of the management of data storage on the physical disks.

When such storage systems have to be used in critical information systems such as the on-board systems in aircraft, submarines or also the systems for management and control of nuclear power stations, it is necessary to comply with security standards. These systems, if they cannot be protected from all malfunctions, must be capable of detecting the latter when they occur. The redundancy of the electronic disks aims to fulfil this role. The function of detection of malfunctions is typically implemented within the redundancy management module 104. Typically, when an order for reading at a given address is generated by the file system 103, the redundancy management module 104 will duplicate the command on the redundant electronic disks 110 and 120. It will then compare the read values returned by the redundant disks and compare them. A difference in these read values makes it possible to detect that at least one of the two disks is malfunctioning. Moreover, when a command for writing a command to an address is generated by the file system 103, this command is sent identically by the redundancy management module 104 to the different disks. The redundancy management module 104 will then reread this address on the different disks and compare the results. If at least one of the disks returns a value different from the value written, a malfunction is detected. Such a system makes it possible to detect the malfunctioning of a physical memory module 112 or 122 on the disks or a fault occurring on the processor tasked with execution of the control module of the disks 111 and 121.

However, such a system does not make it possible to detect a malfunction due to a design error of the control module of the disks 111 and 121. In fact, such a design error being present, by definition, identically in the two control modules 111 and 121, it will cause a homogeneous malfunction of the two disks. Such a malfunction therefore cannot be detected by comparing the values returned by the two disks, which will always be identical.

SUMMARY OF THE INVENTION

The purpose of the present invention is to resolve the aforementioned drawbacks by proposing a data storage system based on a plurality of redundant physical storage devices in which the read/write commands intended to be sent to the redundant disks are subjected to a transfer function before being sent to at least one of the disks so that the actual commands sent to at least two disks are different. The values returned by the disks that received the commands that underwent the transfer function are subjected to the inverse transfer function. Thus, a design error in the control module of the disks will be detected since the control modules of the disks will not be called identically.

The invention relates to a storage device that comprises:
- a plurality of redundant physical storage devices;
- a file system management module generating data read/write commands to the plurality of redundant physical storage devices, the data having to be written redundantly on each of the physical storage devices;
- a module for detecting errors by comparing the values of the data read from the plurality of physical storage devices;

which further comprises:
a module allowing a transfer function to be applied to the read/write commands directed to a subset of physical storage devices, said transfer function being intended to modify said read/write commands. Thus, the design errors within the controllers can be detected.

According to a particular embodiment, with said transfer function modifying the data associated with the write commands, the device further comprises a module for applying an inverse transfer function to the data read from said subset of physical storage devices.

According to a particular embodiment, said module making it possible to apply a transfer function comprises means for applying a bijective function, defined on the data space of the storage device, on the data associated with the write commands and said module making it possible to apply an inverse transfer function comprises means for applying the inverse bijective function on the data read.

According to a particular embodiment, said module making it possible to apply a transfer function comprises means for applying a bijective function, defined on the logical address space of the storage device, on the logical address associated with the command.

According to a particular embodiment, said module making it possible to apply a transfer function comprises means for adding additional commands to the read/write commands.

According to a particular embodiment, said transfer function replaces the address associated with the command with the result from subtraction of this address from the end address of the logical address space of the storage device.

According to a particular embodiment, said transfer function is only applied to the even addresses, or to the odd addresses.

According to a particular embodiment, said transfer function comprises means for ones' complementation of the data associated with the write commands and said inverse transfer function also comprises means for ones' complementation of the data read.

According to a particular embodiment, said transfer function comprises means for inserting additional commands before the very first command received.

According to a particular embodiment, said transfer function comprises means for inserting additional commands periodically.

According to a particular embodiment, said transfer function comprises means for inserting additional commands randomly.

The invention also relates to a read/write method on a storage device comprising a plurality of redundant physical storage devices, characterized in that it comprises:
- a step of receiving an initial read/write command generated by a file system management module;
- a step of applying a transfer function to said initial read/write command, said transfer function being intended to modify said initial read/write command in order to obtain at least one modified read/write command;
- a step of sending said initial read/write command to a first subset of physical storage devices;
- a step of sending the modified read/write command or commands to a second subset of physical storage devices;

if the command is a write command, the method further comprises:
- a step of generating the associated read command;
- a step of applying the transfer function to the read command generated;
- a step of sending the read command to the first subset of physical storage devices;
- a step of sending the modified read command to the second subset of physical storage devices;
- a step of receiving the values read; and
- a step of comparing the values read.

According to a particular embodiment, with said transfer function modifying the data associated with the write commands, the method further comprises a step of applying an inverse transfer function to the data read which originates from the second subset of physical storage devices.

The invention also relates to a computer program comprising instructions suitable for implementing each of the steps of the method according to the invention when said program is executed on a computer.

The invention also relates to a removable or non-removable data storage means, partially or totally readable by a computer or a microprocessor comprising code instructions of a computer program for executing each of the steps of the method according to the invention.

Other features and advantages of the invention will also become apparent from the following description.

BRIEF DESCRIPTION OF THE DRAWINGS

In the attached drawings, given as non-limitative examples.

DETAILED DESCRIPTION OF THE PREFERRED EMBODIMENTS

Figure 2:
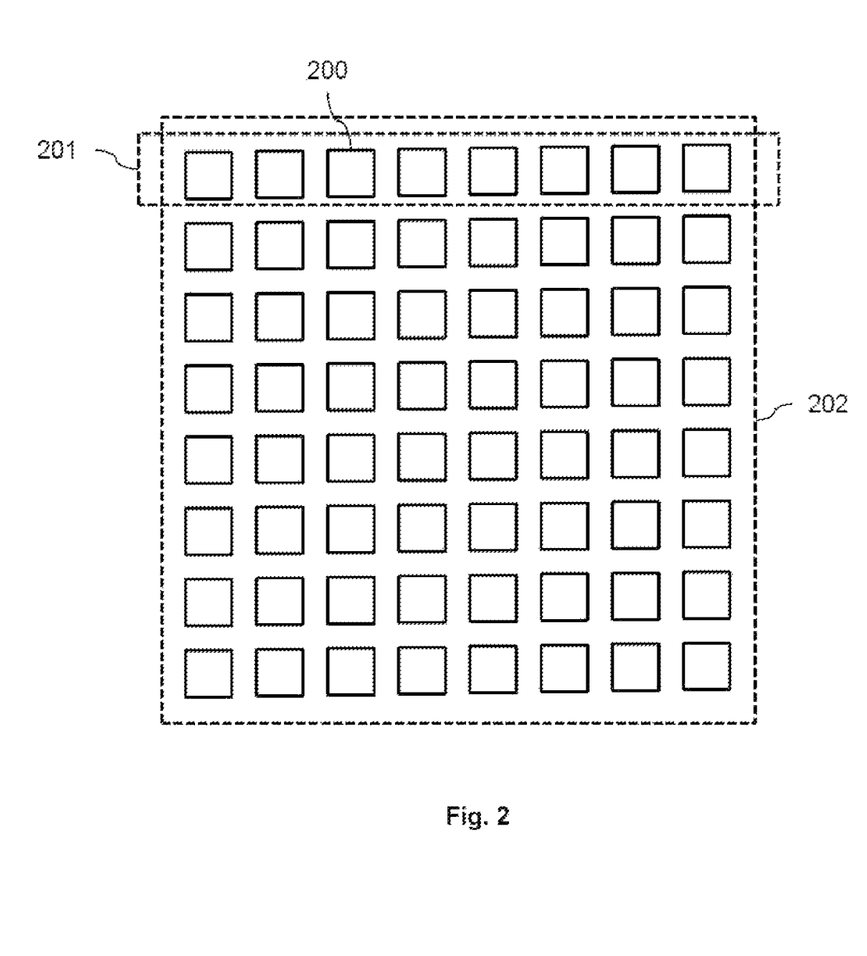
FIG. 2 illustrates the typical material architecture of a flash memory medium used in electronic disks.

FIG. 2 illustrates the typical material architecture of a flash memory medium used in electronic disks. The data stored on the physical medium are composed of elementary memory cells or words 200. These cells 200 are organized in pages 201 containing a set of cells 200. The page 201 is the base unit for the read/write operations of the cells 200. For reading or writing a particular cell, it is therefore necessary to read or write the entire page containing the cell in question. The pages themselves are organized in blocks 202 containing a set of pages 201. The storage medium itself consists of a set of these blocks 202. The block is the base unit of the operations for erasing the cells 200. In fact, it is not possible to write a page 201 of cells 200 unless these cells 200 constituting the page 201 are erased beforehand. This erasure operation necessarily involves the whole of block 202 including the page 201 in question. The operation of erasing a block is an operation that takes a relatively long time relative to the time required for reading or writing a page. Intelligent management of the cycles of reading/writing/erasing is therefore advantageous in an endeavor to limit the operations of erasing blocks in the interests of performance.

Moreover, the blocks are the object of a phenomenon of wear characterized by a limited number of erasures. This phenomenon has the effect that it is all the more useful to limit the operations of erasing blocks to what is strictly necessary. Moreover, the data have a variable life expectancy. Certain data are never updated whereas others are modified frequently. The data that are modified frequently will involve numerous operations of rewriting and as many operations of erasing the blocks containing them. Intelligent management of the physical location of the data on the blocks subject to the rewritings makes it possible to distribute the wear of the blocks. The aim is to avoid having certain heavily used blocks reach the limit of the erasure number and having to be deactivated while most of the blocks are still a long way from the end of their life.

These constraints require special, relatively complex management of the cycles of reading/writing/erasing. This management is typically carried out by software modules within the control module of disks 111 and 121. Traditionally the data stored in memory or on a magnetic disk are associated with a given physical location which does not change once allocated. An item of data is associated with a physical memory address or with a sector on a magnetic disk. When this item of data has to be changed, the new value is written to the same physical location and will overwrite the old value. A read access is therefore always made at the same physical address and makes it possible to obtain the last value written.

This policy of physical allocation of the data leads to ageing through wear of the blocks due to multiplication of the block erasure operations containing frequently modified data in the case of electronic disks. Intelligent management of the physical allocation of the data has therefore been developed to remedy these drawbacks. This allocation policy mainly comprises three key mechanisms. A first mechanism is implemented in the form of an algorithm called flash translation layer algorithm (FTL). According to this algorithm, the blocks are distributed in two sets of blocks, those that are block mapped and those that are page mapped. These two sets of blocks differ in the manner of addressing permitting read/write data access. Note that the base unit of the read/write operations is the page. The data are therefore associated at the application level with a page by means of a logical page address called LPN (for Logical Page Number). The flash translation layer FTL must therefore translate this logical page address into a physical page address of the memory component.

If the item of data is attributed to a block-mapped block, translation is carried out by the following method. The logical page address is decomposed into a first field constituting a logical block number (LBN) and an offset. An association table makes it possible to retrieve the physical block number (PBN), starting from the logical block number serving as index in this association table. The offset value gives the physical address of the page within the physical block.

If the item of data is attributed to a page-mapped block, translation is carried out by the following method. The logical page address serves directly as the index in an association table of the pages, which makes it possible to obtain a physical page number (PPN). This physical page number is directly the address of the physical page within a page-mapped block.

This system organizing the physical memory blocks in two sets of block-mapped or page-mapped blocks is used in the following way. When an item of data is written for the first time, it is assigned a physical location within a block-mapped block. The block-mapped blocks therefore correspond to the first memory allocations of the data. The page-mapped blocks constitute a memory space of pages organized in a log. This log constitutes a space of consecutive pages that will be allocated successively. When an item of data must be changed, to avoid changing the page allocated to this item of data, which would require erasure of the block, a new page, by default the first free page, is allocated to this item of data in the log. Writing of this modified item of data is therefore carried out in a free page, which does not require a prior erasure operation. The page that contained the old value of the item of data is then marked as obsolete, but is not erased immediately so as not to generate an erasure operation. The association pages are then updated accordingly.

This method makes it possible to change the data stored in the memory without requiring an erasure operation, at least while there are still free pages in the log. The static data that are never changed remain allocated in block-mapped blocks access to which is less costly in terms of memory. In fact, the block association table, which only contains one entry per block, is smaller than the page association table, which contains one entry per page. The dynamic data that are changed are stored in the log, which they fill as the changes are made.

This mechanism is particularly efficient in terms of access time because it avoids the block erasure operations. On the other hand, each change of data makes at least one page of memory obsolete. After the system has been in use for a certain time, there may be a shortage of free blocks whereas the used blocks are littered with obsolete pages. To correct this problem and allow the set of free blocks to be reconstituted, a garbage collector mechanism is provided. This mechanism selects the blocks in which all the pages are marked as obsolete, and then erases the block to make it available again within a set of free blocks. Advantageously, the garbage collector incorporates a block merge mechanism. This mechanism makes it possible to select a set of blocks containing numerous obsolete pages. These blocks must overall contain a number of useful, i.e. not obsolete, pages less than or equal to the size of a block. These useful pages are then written in a free block. All the selected blocks can then be erased to be made available in the set of free blocks. This garbage collector therefore makes it possible to gather the useful pages disseminated within a set of blocks in one and the same block and make these blocks available again.

A wear leveling algorithm makes it possible, moreover, to avoid having certain blocks age prematurely owing to a large number of erasure operations being carried out on them. This mechanism provides all the blocks with a counter showing the number of erasure operations that they have undergone. Thus, when the system reclaims a new free block to assign it to the set of block-mapped blocks or to the set of page-mapped blocks, the free block having the lowest counter value is designated. Thus, the blocks that are the least worn are always used as a priority. The appearance of a block that is worn out and therefore unusable is thus delayed.

Figure 3:
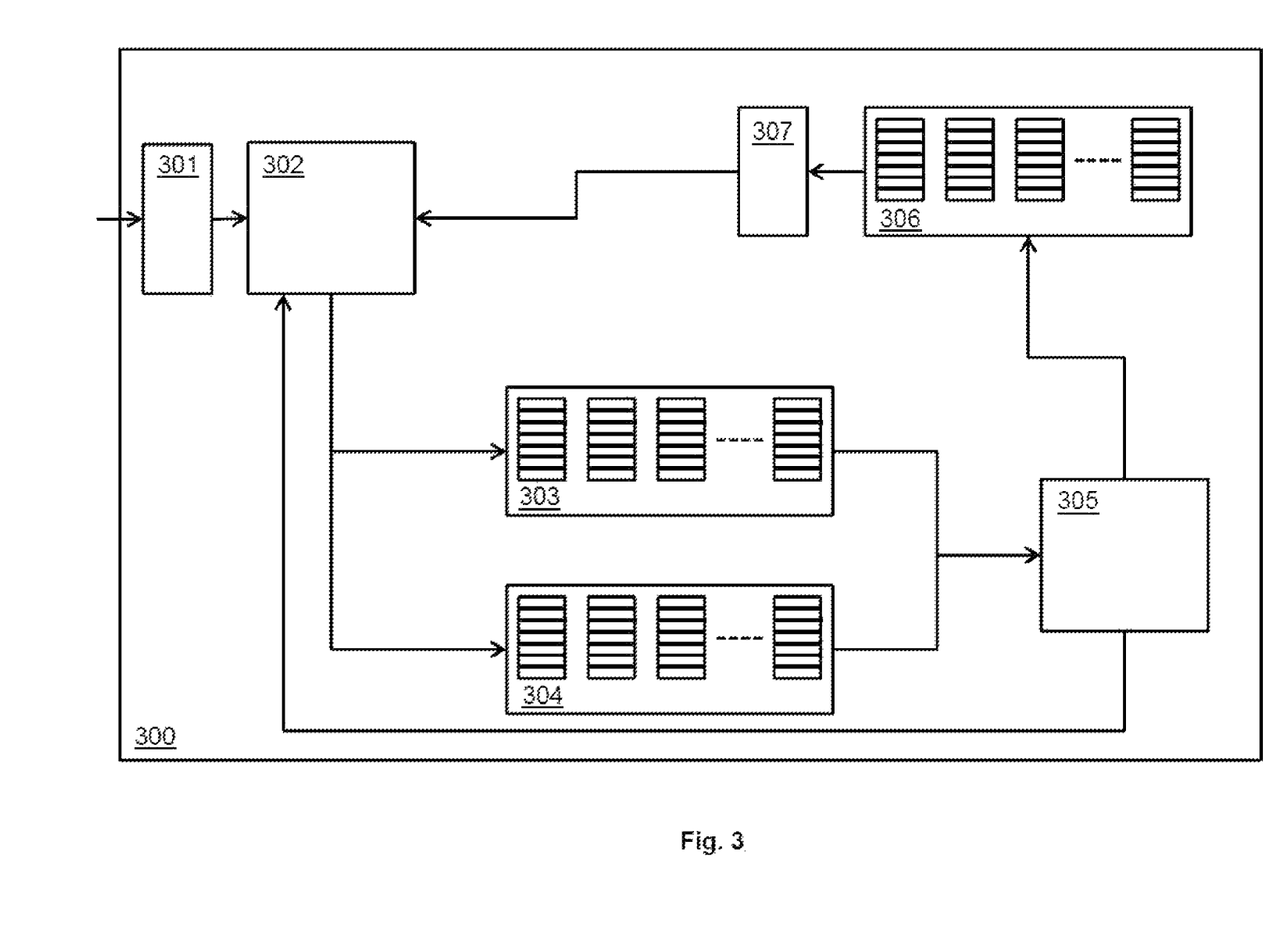
FIG. 3 illustrates an example of logical structure of an electronic disk controller.

FIG. 3 illustrates an example of the logical structure of an electronic disk controller 300 implementing these various mechanisms. The read/write commands are received and stored in a cache memory 301 before being interpreted by the flash translation layer 302. The latter controls two sets of allocated memory blocks, a first set 303 of block-mapped blocks and a second set 304 of page-mapped blocks forming the log. The flash translation layer will therefore write the data firstly in the set 303 of block-mapped blocks. The next write operations that will change the item of data are carried out in the log 304. The flash translation layer 302 needs a free block supplied by a set of free blocks 306. The free block is allocated by the wear leveling algorithm 307, which ensures that the block allocated is always a block possessing a minimum wear counter within the set of free blocks 306. This block is then allocated as required, either to the set 303 of block-mapped blocks, or to the log 304. The garbage collector 305 undertakes recovery of the blocks from these two sets, applying if necessary the block merge mechanism described above. The blocks thus recovered are erased to go back in the set of free blocks 306. Their wear counter is then incremented by one unit.

Such an electronic disk controller is therefore complex and represents software of considerable size. When the problem arises of using such a disk in an environment requiring a high level of security, such as an aircraft, a nuclear power station or others, the software employed must meet certain security standards, such as those recommended by the document DO-178B used for example by the aeronautical industry. The use of an electronic disk in an aircraft would therefore require the complete rewriting of the disk controller to meet the recommendations of this document. It would be advantageous to be able to use commercially available electronic disks directly in aircraft with their original controller. However, such use means that the controller may contain a design error that might not be detected, even using a redundant system such as described with reference to FIG. 1.

In particular, a design error in the controller can lead to the following errors in a redundant system. In errors of a first type, the item of data is incorrectly written on the disk. In errors of a second type, the item of data is correctly written but to a wrong address. In a third type of error, the item of data is not written on the disk at all. In all three cases, the command returns an acknowledgment of receipt notifying success of the write operation. As the error is reproduced identically by the second disk, it will not be detected by subsequent reading and comparison of the data read on the two disks.

The invention is based on the introduction of a dissimilarity in the operation of the redundant electronic disk controller. Causing different operation of the two controllers prevents a design error in the software of these controllers from being produced similarly in both disks, causing one and the same error. Thus, any design errors present in the code of the controllers will be produced at different time points on different data and will therefore be detectable by the command monitoring mechanism. This monitoring mechanism, it will be recalled, consists of rereading the written data and comparing the result of these readings to verify their consistency. According to a preferred embodiment of the invention, this dissimilarity is introduced in the form of a transfer function implemented at the level of the file system 101 FIG. 1, typically within the redundancy management module 104. This transfer function will modify the read/write commands intended for a subset of the redundant electronic disks. It is these modified commands that are then sent for execution on the subset of redundant disks instead of the original commands. On the subset of redundant disks not subject to the transfer function, the original commands are executed directly. Thus, the read/write commands finally executed by the controllers of the disks are different. During reading, an inverse transfer function is applied to the data read so as to ensure consistency of the data read on all the redundant disks. These data can therefore be compared to detect any error. The same data are therefore stored on all the redundant disks, but the storage process and therefore the software path executed by the controllers of the disks are different between the disks subject to the transfer function and those that are not subject to it. By creating this dissimilarity, which causes the execution of different software paths within the controllers of the disks, the probability of a design error of said controllers leading to a similar error on the disks that would therefore escape the error detection mechanism is rendered close to zero. This system of redundant disks can therefore be used in critical systems, meeting the specified security requirements.

Figure 4:
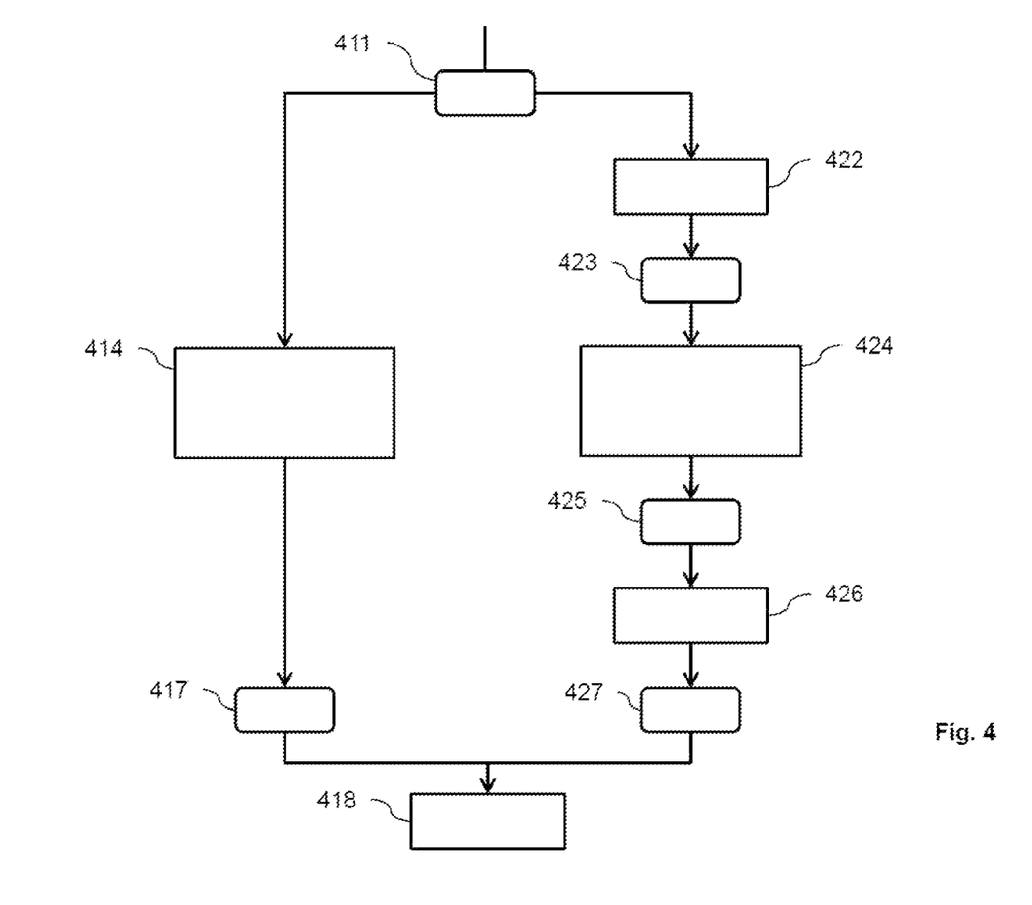
FIG. 4 illustrates the logical architecture of one embodiment example of the invention.

FIG. 4 illustrates the logical architecture of one embodiment example of the invention. A read/write command 411 is sent by the system to the disks. This command 411 is received identically by the redundancy management module 104 FIG. 1. This command 411 is therefore sent to a first disk which is not subject to the transfer function. This same command 411 is also sent to the transfer function 422 for a disk that is subject to the transfer function 422. This function 422 modifies the command 411 and generates at least one command 423 resulting from application of the transfer function to the command 411. In step 414, the disk that is not subject to the transfer function executes the initial command 411. During step 424, the disk subject to the transfer function executes the modified command 423. These executions therefore modify the internal state of the two disks and result in execution of the initial command. However, the two disks have executed the initial command differently. Next, the error detection mechanism comes into play and typically generates a read operation on the two disks in order to verify the consistency of the data subjected to the initial command 411. More precisely, if the initial command 411 is a read command, this read operation serves directly for error detection. If the command 411 is a write command, the corresponding read command is generated to cause reading of the data that have just been written. This read command will also apply the transfer function for the disk that is subject to this function.

On the disk that is not subject to the transfer function, the value read 417 serves directly for verification. On the disk that is subject to the transfer function, the value read 425 will apply the inverse transfer function 426 to generate a final read value 427. These read values are compared by step 418. An error is detected when these values are different.

The read/write commands are characterized on the one hand by a logical address that must be read or written and, in the case of a write operation, by an item of data to be written. The transfer function is therefore tasked with modifying this address plus item of data pair in order to generate the modified command.

Figure 5:
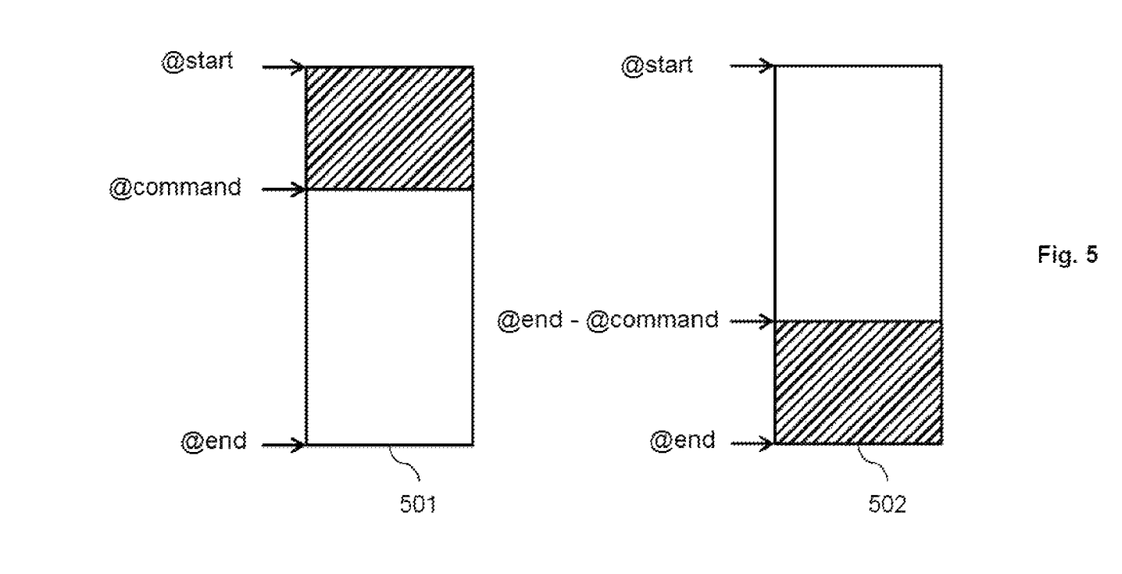
FIG. 5 illustrates an example of spatial dissimilarity.

According to a first embodiment, the transfer function aims to generate a spatial dissimilarity. The modified command will cause reading or writing to an address that is different from the address provided in the original command. For example, if the logical storage space extends between a start address and an end address, this space is logically filled starting from the start address. The transfer function can replace the address contained in the command with the end address minus this address. Thus, in the disk implementing the transfer function, the storage space will be filled from the end address to the start address. This embodiment is illustrated in FIG. 5. The logical storage space of a first disk 501 not implementing the transfer function is organized for progressive filling starting from a start address @start and as far as an end address @end. The logical storage space of a second disk 502 implementing the transfer function is organized for progressive filling starting from the end address @end and as far as the start address @start. A command relating to an address @command is executed directly at this address on a disk not subject to the transfer function. This reversal of the direction of filling of the logical space of the disk subject to the transfer function is obtained by replacing the address relating to the command @command with the address @end-@command by the transfer function. The command modified by the transfer function is therefore in this case the initial command, the address of which has thus been modified. The same data are therefore written identically on the two disks but at different logical addresses. The read commands undergo the same modifications and therefore allow the good data to be read consistently on all the disks. Another transfer function generating a spatial dissimilarity can consist of adding an offset to the original address. Another possibility is to apply the modification only to the even addresses, or conversely to the odd addresses. A person skilled in the art understands that the transfer function can consist of any bijective mathematical function defined on the logical address space of the disks. Such a function necessarily generates a spatial dissimilarity.

Figure 6:
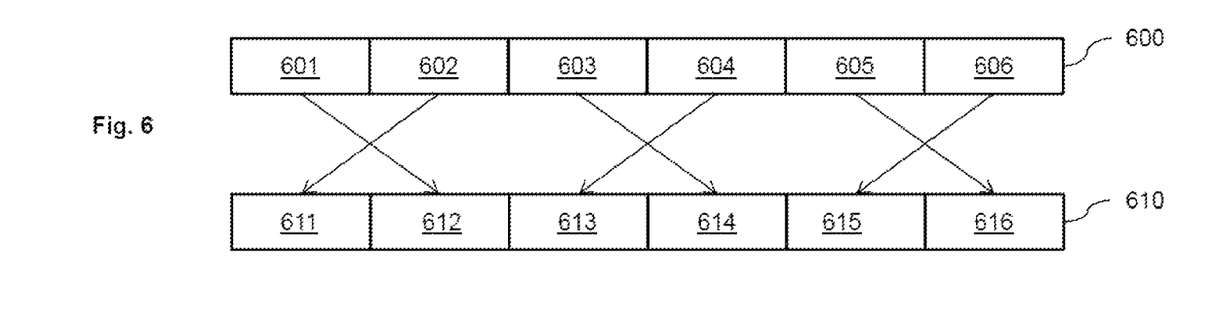
FIG. 6 illustrates another example of spatial dissimilarity.

FIG. 6 illustrates another example of spatial dissimilarity. In this example, the data are organized in a segmented logical data set 600. This set comprises a set of segments 601, 602 to 606. The transfer function performs a permutation of segments. In the example, the modified data set 610 is constituted by the same segments 611 to 616 arranged in a different order. A two by two permutation of the segments was carried out in the example of FIG. 6. Any other permutation can be envisaged. As in the preceding examples of spatial dissimilarity, this result is obtained by applying a transfer function producing a bijective relationship between the addresses of the commands. The addresses corresponding to the original block 601 are modified to correspond to the modified block 612, those of block 602 are modified to correspond to those of block 611 and so on for all of the blocks.

In the case of a spatial dissimilarity, the inverse transfer function affecting the data read is the identity. Only the read and write commands, including the read commands used by the error detection mechanism, are modified. In this embodiment a design error connected with the address used would not be produced uniformly on all the disks and would be detected. It should also be noted that this different distribution of the data leads to allocation of different blocks and therefore different execution of the garbage collector and wear leveling mechanisms.

According to a second embodiment, the transfer function implements a dissimilarity of pattern. In this case, the transfer function modifies the item of data associated with the command. It consists of applying a bijective function to this item of data. This bijective function is defined on the data space of the storage device, typically the space constituted by the set of possible data words. It therefore only relates to the write commands that are the only ones to be associated with an item of data. The read commands are not modified. An example of transfer function generating a dissimilarity of pattern consists of ones' complementation of the item of data that has to be written. That is, the bits representing the item of data are reversed one to one. The inverse transfer function consists in this case of applying the inverse bijective function to the data read so as to retrieve the initial item of data. In the case of the ones' complement, the inverse function is also the ones' complement. In this embodiment, the data are therefore stored at the same addresses on a disk subject to the transfer function as on a disk that is not, but the value of the item of data is modified. Thus, a design error that would be linked to the value of the item of data written would not be produced uniformly on all the disks and would be detected.

According to a third embodiment, the transfer function generates a temporal dissimilarity. In this case the transfer function modifies the initial command by adding to it at least one other command, which shall be called phantom command. This insertion of additional phantom commands aims to modify the temporal sequence of the commands executed by the disk or disks subject to the transfer function. It also has the effect of modifying the physical geographical distribution of the data owing to additional write operations inserted in the original write operations requested by the file system. Consequently it also causes a change in the operation of the garbage collector and wear levelling mechanisms. Advantageously the insertion is not systematic at each command in order to avoid an excessive extra loading in calculation time and physical space allocated on the disk that is subject to the transfer function. The insertion can be either random or periodical. According to a particular embodiment it makes it possible to insert additional commands before the very first write command received. Thus, the sequence of the commands is modified right from the first useful command. The useful commands are the original commands defined, as opposed to the additional commands. It can consist of the insertion of write commands of random data in free spaces of the logical storage space. It can also consist of the insertion of read commands. The latter, even if they do not modify the data written on the physical disk, nevertheless allow modification of the contents of the cache memories and therefore the introduction on this basis of dissimilarities in the software paths used by the disk controller. It should also be noted that a garbage collector that would be triggered periodically on the basis of a period expressed as the number of commands executed will not be triggered at the same time points owing to the insertion of the phantom commands. Therefore its behavior will not be similar on all the disks. The inverse transfer function is the identity in this embodiment, as the logical addresses and the related data are not modified in the useful commands.

During an unexpected shutdown of a disk, commonly a capacitor provides energy supply to the disk for a short period of time. This time is utilized for emptying the cache memory. It may happen that this period of time is not sufficient and that certain cached blocks do not have time to be saved to the medium and so are even corrupted. Temporal dissimilarity, by causing delayed sending of data to the disk subject to the transfer function, causes a dissimilarity in the sequence of blocks that can be corrupted. These errors will therefore be detectable.

Figure 7:
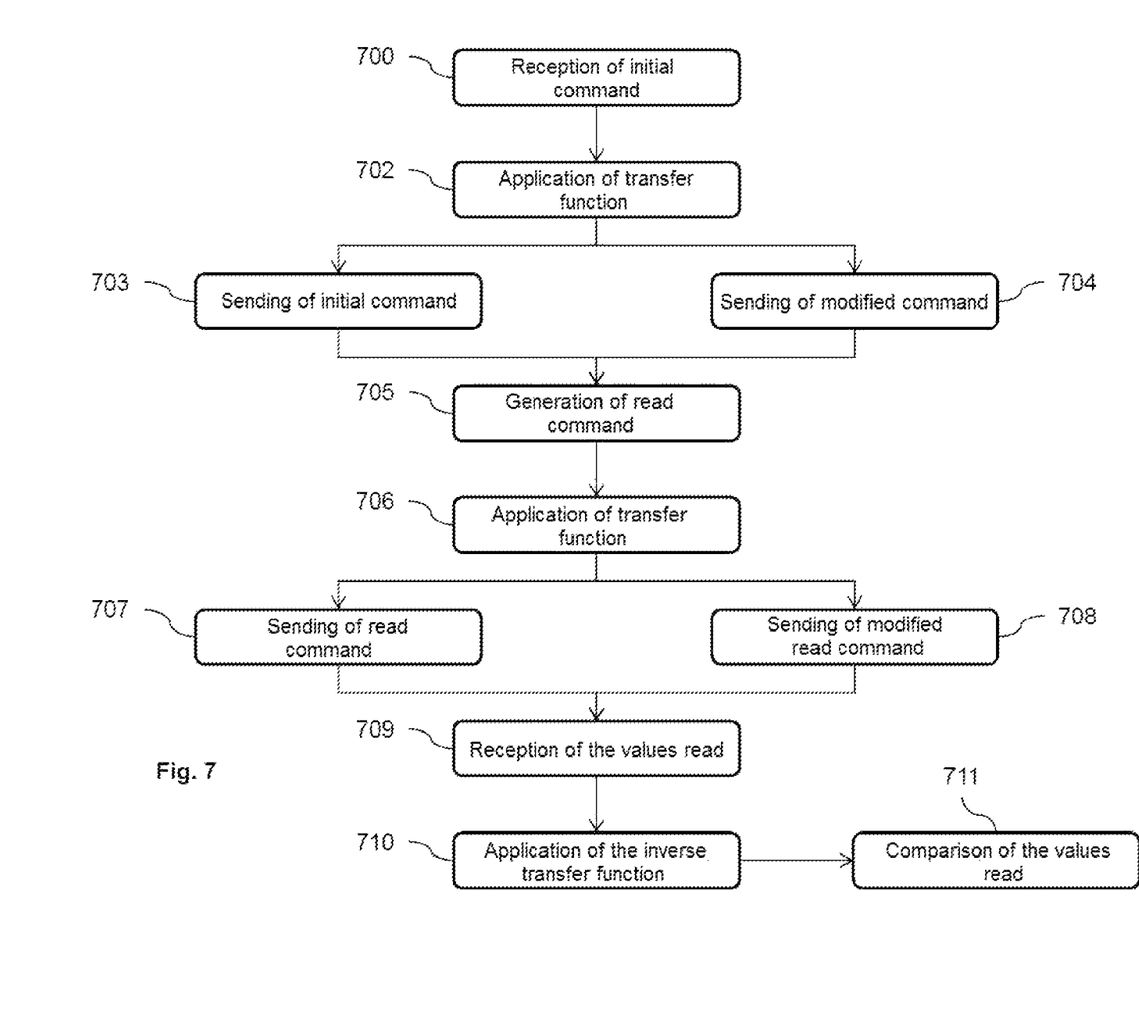
FIG. 7 illustrates the flowchart of a read/write method according to one embodiment example of the invention.

FIG. 7 shows the flowchart of a read/write method according to one embodiment example of the invention. This method is implemented typically in the redundancy management module 104 FIG. 1. In a first step 700 this module receives, from the file system, an initial read/write command intended for the physical storage devices. A transfer function for modifying this initial command is applied in a step 701. At least one modified read/write command is then obtained by applying this transfer function. The initial command is sent to a first subset of physical storage devices in a step 703. In parallel, the modified command or commands are sent to a second subset of physical storage devices in step 704. If the initial command is a write command, and only in this case, a step 705 generates the associated read command. That is to say, the command for reading the data stored at the logical address contained in the write command. The aim is to reread the item of data that has just been written so as to be able to verify that the write operation has gone well. This read command generated is also subjected to the same transfer function in step 706 in order to generate one or more modified read commands. Still only in the case when the initial command was a write command, the read command generated is then sent to the first subset of physical storage devices in step 707. The modified read command is sent to the second subset of physical storage devices in step 708. The values read are received in step 709. The read values sent by the second subset of physical storage devices are subjected to application of the inverse transfer function in step 710. This step is only necessary in the case when the data have been modified by the transfer function, i.e. in the case of a dissimilarity of pattern. In step 711, the read values received and the modified read values are compared in order to detect any malfunction on one of the disks. This method also makes it possible to detect design errors in the software for controlling the physical storage devices that will not be produced identically in the physical storage devices of both subsets.

These three embodiments of the invention can be combined two by two depending on the dissimilarities sought. According to a preferred embodiment, the three modes of dissimilarity are combined. Thus, the level of dissimilarity between the disks subject to the transfer function and the disks that are not is thereby increased. The probability that a design error in the disk controller is not detected is then minimized.

According to another embodiment, the set of redundant disks is divided into more than two subsets. Only one of the subsets is not subject to a transfer function. The other disk subsets are then subjected to a transfer function. This transfer function is specific for each subset. The error detection mechanism then compares the results provided by each of the subsets to verify their consistency.

The redundancy according to the invention can also be combined with the redundancy mechanisms that aim to guarantee fault tolerance such as the mechanisms known by the name RAID (Redundant Array of Independent Disks). This redundancy of the RAID type would then also typically be managed by the redundancy management module 104 FIG. 1.

Although particularly useful in the case of electronic disks owing to the complexity of the controllers integrated in these disks, the invention can also be implemented advantageously on the basis of any type of physical storage devices such as conventional magnetic disks, optical disks, remote disks or others.

Figure 8:
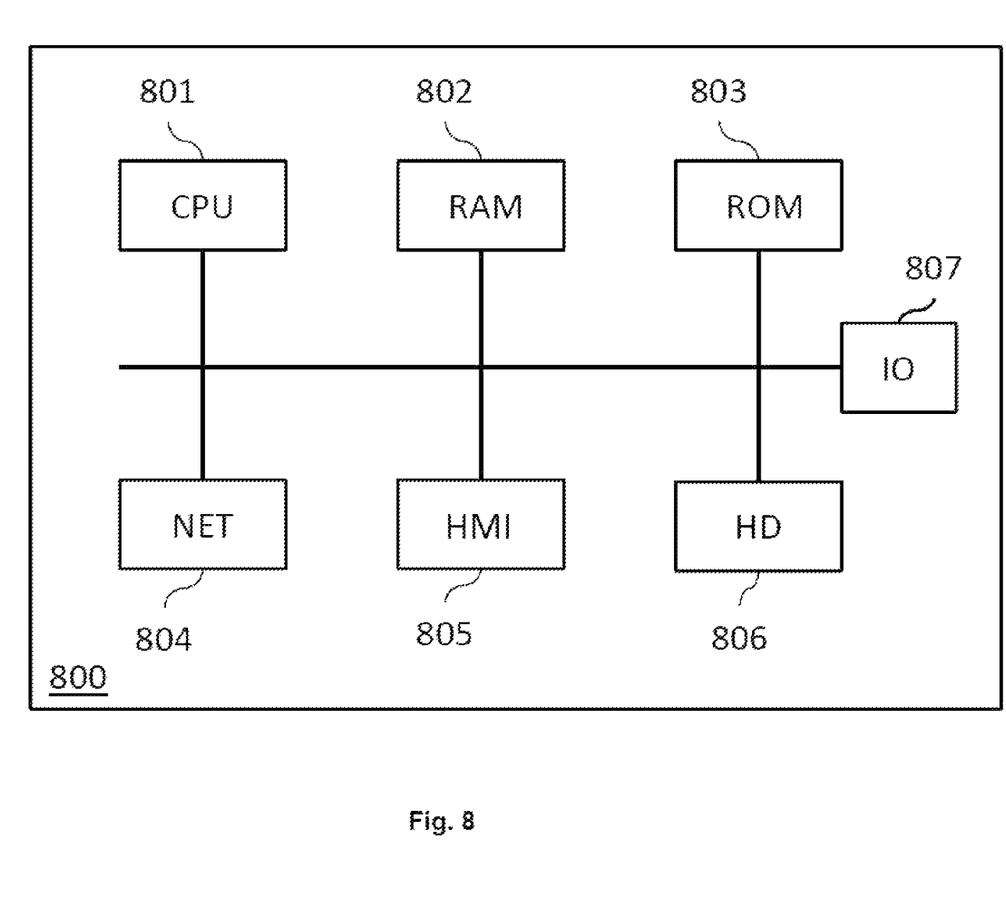
FIG. 8 is a schematic block diagram of a data processing device for implementing one or more embodiments of the invention.

FIG. 8 is a schematic block diagram of a data processing device 800 for implementing one or more embodiments of the invention. The data processing device 800 can be a peripheral such as a microcomputer, a work station or a mobile telecommunication terminal. The device 800 comprises a communication bus connected to:

a central processing unit 801, such as a microprocessor, designated CPU;

a random access memory 802, designated RAM, for storing the executable code of the method for carrying out the invention as well as the registers suitable for recording variables and parameters necessary for implementing the method according to embodiments of the invention; the storage capacity of the device can be supplemented by an optional RAM memory connected to an extension port, for example;

a read-only memory 803, designated ROM, for storing computer programs for implementing the embodiments of the invention;

a network interface 804 is normally connected to a communication network over which digital data to be processed are transmitted or received. The network interface 804 can be a single network interface, or composed of a set of different network interfaces (for example wired and wireless interfaces or different types of wired or wireless interfaces). Data packets are sent to the network interface for transmission or are read from the network interface for reception under the control of the software application executed in the processor 801;

a user interface 805 for receiving a user's inputs or for displaying information to a user;

a storage device 806 as described in the invention and designated HD;

an input/output module 807 for receiving/sending data from/to external peripherals such as hard disk, removable storage medium or others.

The executable code can be stored in a read-only memory 803, on the storage device 806 or on a removable digital medium such as for example a disk. According to a variant, the executable code of the programs can be received by means of a communication network, via the network interface 804, in order to be stored in one of the storage means of the communication device 800, such as the storage device 806, before being executed.

The central processing unit 801 is suitable for controlling and directing the execution of the instructions or portions of software code of the program or programs according to one of the embodiments of the invention, said instructions being stored in one of the aforementioned storage means. After switching on, the CPU 801 is able to execute instructions of the main RAM memory 802, relating to a software application. Such software, when executed by the processor 801, causes the steps of the methods described to be executed.

In this embodiment, the equipment is programmable equipment that uses software for implementing the invention. However, additionally, the present invention can be implemented in the hardware (for example, in the form of an application-specific integrated circuit (ASIC)).

Naturally, to satisfy specific needs, a person competent in the field of the invention will be able to apply modifications to the foregoing description.

Although the present invention has been described above with reference to specific embodiments, the present invention is not limited to the specific embodiments, and the modifications that are within the field of application of the present invention will be evident to a person skilled in the art.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A storage device comprising:
   a plurality of redundant physical storage devices wherein the plurality of redundant physical storage devices include a first set and a second set of physical storage devices each physical storage device having a controller;
   a data processing device;
   a file system management module, implemented by the data processing device, generating data read/write commands for the plurality of redundant physical storage devices, data having to be written redundantly on each of the physical storage devices;
   a module, implemented by the data processing device, for applying a transfer function to the read/write commands for a subset of physical storage devices, said transfer function being intended to modify said read/write commands;
   a module, implemented by the data processing device, for reading data resulting from the read/write commands from the first set of physical storage devices and the second set of physical storage devices;
   a module, implemented by the data processing device, for applying an inverse transfer function to the read data from the second set of physical storage devices;
   a module, implemented by the data processing device, for detecting a design error for each controller by comparing the read data from the first set of physical storage devices to the data read from the second set of physical storage and on which the inverse transfer function was applied.

2. The storage device according to claim 1, wherein said transfer function modifying the data associated with the write commands, the storage device further comprising a module for applying an inverse transfer function to the data read from said subset of physical storage devices, implemented by the data processing device.

3. The storage device according to claim 2, wherein said transfer function is implemented by the data processing unit to apply a first bijective function, defined on a data space of the storage device, on the data associated with the write commands.

4. The storage device according to claim 1, wherein said transfer function is implemented by the data processing unit to apply a second bijective function, defined on a logical address space of the storage device, on the logical address associated with the command.

5. The storage device according to claim 1, wherein said transfer function is implemented by the data processing unit to add additional commands to the read/write commands.

6. A storage device comprising:
   a plurality of redundant physical storage devices;
   a data processing device;
   a file system management module, implemented by the data processing device, generating data read/write commands for the plurality of redundant physical storage devices, the data having to be written redundantly on each of the physical storage devices;
   a module, implemented by the data processing device, for detecting errors by comparing the values of the data read from the plurality of physical storage devices; and
   a module, implemented by the data processing device, for applying a transfer function to the read/write commands for a subset of physical storage devices, said transfer function being intended to modify said read/write commands;
   wherein:
      said transfer function is implemented by the data processing unit to apply a second bijective function, defined on a logical address space of the storage device, on the logical address associated with the command;
   said second bijective function replaces the address associated with the command with a result from subtraction of this address from an end address of the logical address space of the storage device.

7. The storage device according to claim 1, wherein a second bijective function is only applied to even addresses, or to odd addresses.

8. A storage device comprising:
   a plurality of redundant physical storage devices;
   a data processing device;
   a file system management module, implemented by the data processing device, generating data read/write commands for the plurality of redundant physical storage devices, the data having to be written redundantly on each of the physical storage devices;
   a module, implemented by the data processing device, for detecting errors by comparing the values of the data read from the plurality of physical storage devices; and
   a module, implemented by the data processing device, for applying a transfer function to the read/write commands for a subset of physical storage devices, said transfer function being intended to modify said read/write commands;
   wherein:
      said transfer function modifying the data associated with the write commands, the storage device further comprising a module, implemented by the data processing device, for applying an inverse transfer function to the data read from said subset of physical storage devices;
      said transfer function is implemented by the data processing unit to apply a first bijective function, defined on a data space of the storage device, on the data associated with the write commands;
      said first bijective function is implement by the data processing device and performs a ones' complementation of the data associated with the write commands.

9. A storage device comprising:
   a plurality of redundant physical storage devices;
   a data processing device;
   a file system management module, implemented by the data processing device, generating data read/write commands for the plurality of redundant physical storage devices, the data having to be written redundantly on each of the physical storage devices;
   a module, implemented by the data processing device, for detecting errors by comparing the values of the data read from the plurality of physical storage devices; and
   a module, implemented by the data processing device, for applying a transfer function to the read/write commands for a subset of physical storage devices, said transfer function being intended to modify said read/write commands;
   wherein:

said transfer function is implemented by the data processing unit and inserts additional commands such that the additional commands are inserted at least one of:
before a first command,
periodically, and
randomly.

10. A method for reading/writing on a storage device comprising a plurality of redundant physical storage devices, comprising the steps:
receiving an initial read/write command generated by a file system management module implemented by a data processing unit;
applying a transfer function, by the data processing unit, to said initial read/write command, said transfer function being intended to modify said initial read/write command in order to obtain at least one modified read/write command;
sending, by the data processing unit, said initial read/write command to a first subset of physical storage devices wherein each physical storage device in the first subset includes a controller;
sending, by the data processing unit, the modified read/write command or commands to a second subset of physical storage devices wherein each physical storage device in the second subset includes a controller;
if the command is a write command, the method further comprises:
generating, by the data processing unit, an associated read command;
applying, by the data processing unit, the transfer function to the read command generated;
sending, by the data processing unit, the associated read command to the first subset of physical storage devices;
sending, by the data processing unit, the read command modified by the transfer function to the second subset of physical storage devices;
receiving, by the data processing unit, the values read; and
comparing, by the data processing unit, the values read to detect a design error for each controller in the first subset and second subset of physical storage devices.

11. The method according to claim 10, wherein said transfer function modifying the data associated with the write commands further comprises a step of applying an inverse transfer function to the data read which originates from the second subset of physical storage devices.

12. A computer program comprising instructions stored on non-transitory storage means suitable for implementing each of the steps of the method according to claim 10 when said program is executed on a computer.

13. Removable or fixed non-transitory data storage means, partially or fully readable by a computer or a microprocessor comprising code instructions of a computer program for execution of each of the steps of the method according to claim 10.

* * * * *